Aug. 19, 1958  H. I. CHAMBERS  2,847,694
WINDSHIELD WIPER FOR CURVED GLASS
Filed July 2, 1953
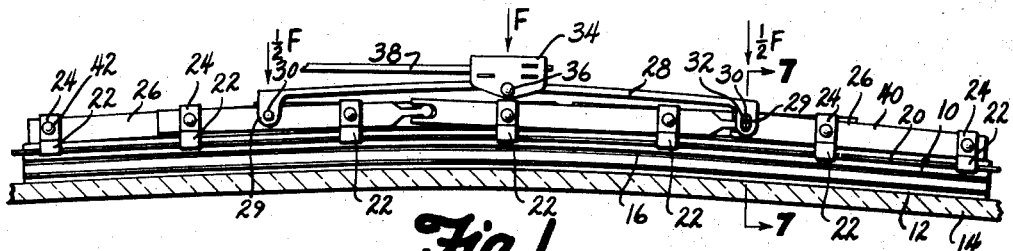
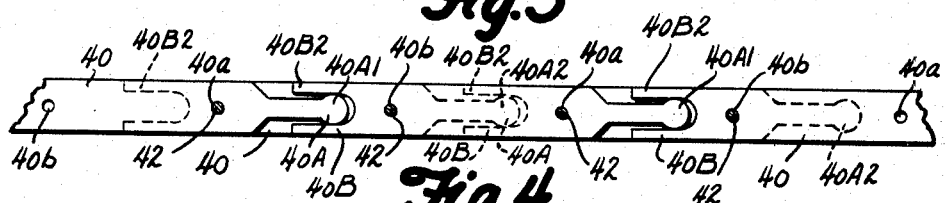
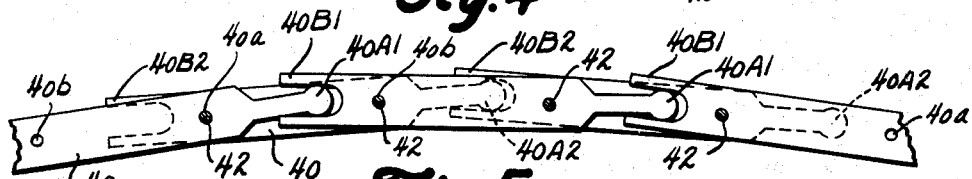
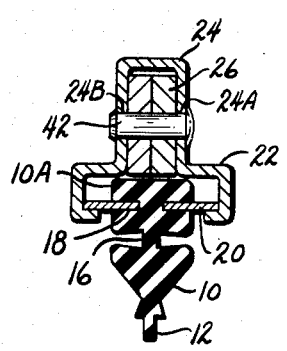
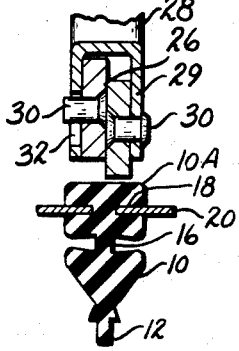
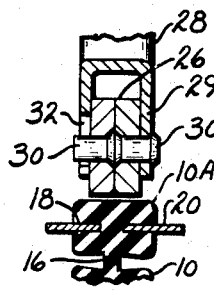
INVENTOR.
Herbert I. Chambers
BY
Fahrney, Souther & Stollenberg United States Patent Office 2,847,694
Patented Aug. 19, 1958

2,847,694
WINDSHIELD WIPER FOR CURVED GLASS
Herbert I. Chambers, Toledo, Ohio
Application July 2, 1953, Serial No. 365,576
12 Claims. (Cl. 15—245)

This invention relates to windshield wipers, more particularly to windshield wipers suitable for use with curved windshields.

The present invention contemplates the provision of a windshield wiper element particularly suitable for use with curved windshields over which the blade is adapted to be oscillated, so that the blade must constantly conform itself to the varying curvature of the surface of the windshield. The surface to be cleaned by the oscillating blade movable about a pivot varies generally from a straight line to a line having maximum curvature, most usually found at the outer-most point of its sweep, where the windshield folds itself around sharply adjacent the sides of the automobile body.

The well-known rubber squeegee element having a wiping edge and a resilient backing member bendable in one plane is provided with mutually-reactive elements consisting of a pair of cooperating interlocking link chains which maintain the wiping edge of the squeegee in the locus of an arc to closely contact the surface of the glass of the windshield during the wiping stroke even though the curvature of the surface varies from a straight line to one having maximum curvature. The pressure is applied to the assembly from a point source of pressure consisting of the terminating end of the oscillating arm to a yoke connected to the assembly at two spaced points spaced equally from the ends of the squeegee. The application of pressure on the spaced points cooperating with the curvature of the glass causes the reactive member to assume a position in the locus of an arc, so that the wiping edge substantially uniformly contacts the curved surface with substantially uniform pressure per unit length.

It is, therefore, a principal object of this invention to provide a windshield wiper for curved glass which has elements which are mutually reactive and are capable of conforming a wiping edge of a squeegee to the curved glass by the application of pressure to two spaced points along the blade assembly.

It is a further object of this invention to provide a wiper blade for curved glass which is reactive to substantially maintain the wiping edge of the blade in the locus of a circle through the cooperative relation between a pair of interlocking link chains, which transmit force from end to end through mutual interaction of the chains acting about common pivot points.

It is a further object of this invention to provide an improved windshield wiper for curved glass which shall be reactive from end to end to transmit forces to curve the blade from one end to the other.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference caracters designate corresponding parts in the several views.

Fig. 1 is an elevational view of a wiper blade incorporating the invention showing the curved glass of the windshield in section;

Fig. 2 is an elevational view of the wiper blade with the pressure-applying yoke removed;

Fig. 3 is a plan of Fig. 2 looking down on the wiper blade;

Fig. 4 is an enlarged elevational view of the reactive element of the blade in straight conformation;

Fig. 5 is a view similar to Fig. 4 with the recative element in curved conformation;

Fig. 6 is a sectional elevational view taken along line 6—6 of Fig. 2;

Fig. 7 is a sectional elevational view taken along line 7—7 of Fig. 1, with the links in displaced position with reference to the yoke, and Fig. 8 is a view similar to Fig. 7, taken with the links in another position.

Referring to the drawings, particularly to Fig. 1, a rubber squeegee element 10 is shown which is provided with a flexible wiping edge 12 in contact with a curved windshield 14, of, for example, an automobile to which the invention is particularly applicable. Adjacent a central location, the squeegee element 10 is provided with a flexible hinge portion 16 (Figs. 6, 7, and 8), about which the lower element including the flexible wiping edge is adapted to flop to assume an advantageous angle with reference to the glass as it is being oscillated thereover during use. The head portion 10A of the squeegee is provided with longitudinal slots 18 on its side, into which is fitted a metal spring member 20 to form a backing member to allow flexing of the squeegee in only one plane at right angles to the curved glass. Preferably the spring member is made of a single strip of material bent into the form of a U-shaped element into the bight of which the squeegee element is fitted as is best seen in Figs. 6, 7, and 8, with a catch means provided at the open end of the bight as shown in application Serial No. 228,448, filed May 26, 1951, now Patent No. 2,741,792, assigned to the same assignee.

The outer edges of the backing member 20 are embraced by a number of clasps 22 in spaced relation as is best seen in Fig. 1, which are provided with bights 24 (Fig. 6); into which is fitted a reactive member 26 extending substantially the full length of the blade and is utilized to conform and hold the flexible backing member 20 and the rubber squeegee in the locus of an arc, all as will be described in further detail hereinafter. The inwardly extending end portions of the clasps underlie the edges of the backing member, in such relation that the upper face of the head 10A of the rubber squeegee underlies the lower edge of the reactive member 26, fitted as already described in the bight 24 of the clasp. Pressure may, therefore, be transmitted directly from the reactive member to the rubber squeegee by their contactual relation at these surfaces.

The central portion of the reactive member 26 is bridged by a yoke 28 provided with depending ears 29 which are attached to the reactive member by rivets 30 to allow relative movement about the rivets which provides accommodation between the parts as the curvature of the reactive member changes in accordance with the changes of curvature of the windshield as the blade moves over it during oscillation. At the right end of the yoke 28, the forward ear 29 is provided with a slot 32 to allow vertical accommodation between the rivet and the ear as will be further described hereinafter. The ear on the rear side of the yoke 28 at its left end (Fig. 1) is similarly provided with a slot to allow vertical accommo- The yoke 28 is pivotally attached to a clasp 34 by a rivet 36, which is adapted to cooperate with an oscillating arm 38, and provides a means by which the blade assembly can be manually attached and detached from the arm, all as disclosed and claimed in application, Serial No. 231,291, filed June 13, 1951, now Patent No. 2,751,620, assigned to the same assignee. The rivet 36 provides a pivot about which the yoke 28 may rotate with reference to the clasp 34 and the arm 38, so as to allow the blade assembly to accommodate itself with reference to the pivot (not shown) of the arm 38 and the slope changes of the windshield as it is oscillated over the glass.

Having now described the general arrangement of the wiper blade for curved windshields, the reactive member 26 will be described in detail, inasmuch as this member in the blade assembly provides a means whereby the wiping edge 12 of the squeegee is substantially maintained in the locus of an arc having a true radius, which allows the edge 12 to give a good "wipe" of the curved glass during oscillation thereover. Generally speaking, the modern curved windshield is such that the portion to be wiped by the oscillating blade falls within the locus of a cylinder usually having a radius greater than 40 inches with the exception of the ends adjacent the sides of the automobile which often are given an extreme curvature to improve the general appearance of the automobile. Inasmuch as the blade is oscillated over the curved glass by the arm 38 which is connected to a pivotal shaft usually on the cowl of the automobile in front of the lower edge of the windshield, which extends upwardly to the rear from the cowl at a receding angle, it will be understood that the wiper blade, in contacting the receding cylindrical surface of the windshield, must wipe a surface which changes from a straight surface to one having maximum curvature which usually occurs when the blade is in substantially horizontal position. The blade during its oscillating stroke over the cylindrical surface of the windshield must, therefore, constantly change its curvature to accommodate itself to the surface of the glass.

With the surface of the windshield to be cleared by the wiper blade substantially in the locus of a cylinder, it follows that all of the curvatures to be wiped by the blade are of substantially uniform curvature beginning with the straight line to that surface portion having maximum curvature, which has a radius substantially the same radius of that of the windshield surface. The reactive member 26, already generally alluded to above, has the characteristic of maintaining the position of the flexible backing member 20 always substantially within the locus of a circle or arc having a radius of the length substantially equal to that of the surface being wiped, so as to maintain the wiping edge 12 in contact with the glass and thereby provide an efficient cleansing thereof.

The reactive member 26 consists of two parallel cooperating sets or chains of links, consisting preferably of three links, each link 40 being substantially identical to the others in contour, except at the ends, by being provided with a head 40A at one end in the nature of a cylindrical surface and a bifurcated portion 40B at the opposite end, so proportioned to closely engage the head 40A of the next link in its set. Referring to Figs. 3 and 4, an enlarged foreshortened reactive member is shown to clearly disclose the operative principle involved. Each link 40 is provided with spaced apertures 40a and 40b, into which are fitted rivets 42 to provide pivot points, about which the links are adapted to turn in their cooperation with each other in their separate sets. The forward set of links is positioned, so that the head 40A1 of each link 40 fits into the bifurcated portion 40B1 of the link positioned to its right as is clearly shown in both Figs. 3 and 4. The rear set of links is positioned similarly, the parts being numbered 40A2 and 40B2 respectively. The forward and rear sets of links are then connected together by the rivets 42 in overhanging relation at the ends in such a manner that the cooperative relation between head and bifurcated portion alternate from front to rear between the rivets, which also perform the function of holding the sets together in parallel cooperative relation. With this construction, the two sets of three links are mutually reactive and transmit forces longitudinally along the reactive member from link to link, so that the curvature of the member as a whole is always substantially uniform and falls substantially into an arc which has a uniform radius. This characteristic makes the mutually reactive member shown in Figs. 3 and 4 suitable for maintaining the curvature of a windshield wiper blade in such condition that a curved windshield may successfully be cleansed by the blade when applied thereto as shown in Figs. 1 and 2.

The flexible backing member 20 is embraced by the clasps 22 into the bight 24 of which, the reactive member 26 is fitted as is best seen in Figs. 6, 7 and 8. Rivets 42 fitted into apertures 40a and 40b of the links of the reactive member 26 are also fitted into aligning apertures 24A and 24B of the clasp and so tie the resilient backing member with its squeegee to the reactive member, so that as the reactive member is forced to assume an arc, the backing member will assume the same arc, but will do so with a smooth curve rather than a series of short lines tangent to the arc as provided by the links 40. The wiping edge 12 will closely follow the arc of the backing member 20 to provide a good wipe for the curved glass.

Normally the wiper blade when not subject to any external forces will assume a straight line as determined by the flexible backing member 20, but when the arm 38 applies a force to yoke 28, this force is equally divided to its ends where the divided force is applied to rivets 30 positioned at spaced points in the reactive member 26. The rivets 30 are preferably located between the second and third rivets 42 counting from the left end of the blade in Fig. 1 for the left end of the yoke 28, and between rivets five and six for the right end of the yoke. It will then be noted that when the blade is applied to a curved surface, beginning with an unstressed blade as shown in Fig. 2, contact with the curved surface will first be made adjacent a central location of the blade where a counterforce will be built up by pressure against the glass by the squeegee 10. This counterforce acting substantially in the opposite direction of the forces applied by the ends of the yoke 28 to the rivets 30 and being substantially spaced from these opposite forces will form couples tending to move the central portion upwardly relative to the rivets 30, which will move reactively through the chain of links 40 of the reactive member 26 until an arc is attained which will effectively balance the forces whereby the wiping edge will contact the glass along its entire edge. As the arc of the curved glass changes, the interplay of these forces will cause an accommodation in the reactive member to reach the required balance of forces. The wiping edge will, therefore, make a clean wipe over the whole gamut of surfaces of different curvatures as it is oscillated over the curved glass.

When the reactive member 26 accommodates itself to the curvature of the glass, the links 40 forming the member are displaced as is best seen in Fig. 5. This displacement of the links is compensated where the arm 28 is attached to the reactive member 26 by slots 32 in the depending ears 29 cooperating with rivets 30 which are press-fitted and extend outwardly from the links 40 as is best seen in Figs. 7 and 8. The positions of the left hand rivet 30 in Figs. 7 and 8 with reference to the slots is clearly shown and is also applicable to the other end of the yoke 28 where the slot is not shown, being positioned on the rear side of the blade. The change in chordal distance of the reactive member 26 between the ears 29 on the yoke 28 as the reactive member 26 curves to accommodate itself to the glass, is made possible by the loose fits at the points of cooperation between the parts. Horizontal or longitudinal accommodation for change in chordal distance is provided by interplay between the rivets and their cooperating portions by relatively loosely fitting parts, or special provision may be made by providing horizontally disposed slots at some of the rivet connections preferably those adjacent the central portion of the yoke 28.

It is to be understood that the above detailed description of the present invention is intended to disclose an embodiment thereof to those skilled in the art, but that the invention is not to be construed as limited in its application to the details of construction and arrangement of parts illustrated in the accompaying drawings, since the invention is capable of being practiced and carried out in various ways without departing from the spirit of the invention. The language used in the specification relative to the operation and function of the elements of the invention is employed for purposes of description and not of limitation, and it is not intended to limit the scope of the following claims beyond the requirements of the prior art.

What is claimed is:

1. In a device of the class described, a flexible wiping element, a resilient strip to support the wiping element, said strip being bendable in one plane and adapted to conform the wiping element to contact a curved surface to be wiped, a bendable member extending the length of the strip and active in the bending plane of the strip, consisting of several mutually reactive links, pivot points being provided between adjacent links at intermediate points, said links interacting with adjacent links between the pivot points, attachment means at said pivot points between the strip and the member whereby the bending of the strip is controlled by the bending of the member, and means to apply pressure to the assembly at two of the spaced pivot points intermediate the ends of the member, whereby the wiping element is conformed to the curved surface by the mutual interaction of the links.

2. In a device of the class described, a flexible wiping element, a resilient strip to support the wiping element, said strip being bendable in one plane and adapted to conform the wiping element to contact a curved surface to be wiped, a bendable member extending the length of the strip and active in the bending plane of the strip consisting of several links which are pivoted to adjacent links at intermediate points and extending together to interact between the pivot points, attachment means at the spaced pivot points between the strip and the member, whereby the bending of the strip is controlled by the bendable member, and means to apply pressure to the assembly at two of the spaced pivot points intermediate the ends of the member whereby the wiping element is conformed to the curved surface.

3. In a device of the class described, a flexible wiping element, a resilient strip bendable only in a plane at right angles to a curved surface to be wiped, said resilient strip being adapted to support the wiping element and to conform the wiping element to the curved surface, a bendable member extending the length of the strip and active in the bending plane of the strip consisting of several interlocked links, the adjacent links being pivoted together near their medial portions between the interlocking portions thereof, attachment means at the spaced pivot points between the strip and the member whereby the bending of the strip is controlled by the bendable member, and means to apply pressure to the assembly at spaced pivot points intermediate the ends of the member whereby the wiping element is conformed to the curved surface.

4. In a device of the class described, a flexible rubber wiping element, a resilient strip to support the wiping element throughout its length, said strip being bendable in one plane and adapted to conform the wiping element to contact a varying curved surface to be wiped, a bendable member consisting of more than three links interlocked at their ends to adjacent links, and provided with pivot points at intermediate points between the interlocked ends, attachment means at the pivot points between the strip and the bendable member whereby the bending of the strip is controlled by the member to maintain the wiping element in the locus of an arc, and means to apply pressure to the assembly at spaced pivot points intermediate the ends of the member whereby the wiping element is conformed to the curved surface with the pressure being substantially equally applied per unit length of the element.

5. In a device of the class described, a flexible rubber wiping element, a resilient strip of metal to support the wiping element, said strip being bendable in one plane and adapted to conform the wiping element to contact a varying curved surface to be wiped, a bendable arc-forming member comprising interlocking parallel links extending in overlapping relation the length of the strip, attachment means at spaced points between the strip and the member whereby the bending of the strip is controlled by the bendable member to fall within the locus of an arc, and means to apply pressure to the assembly at spaced points whereby the wiping element is conformed to the curved surface.

6. In a device of the class described, a flexible wiping element, a resilient strip movable only in the plane at right angles to a curved surface to be wiped, adapted to support the wiping element and to conform the wiping element to the curved surface, an arc-forming member extending the length of the strip comprising mutually reactive interlocking links pivoted together on each side of an interlocking point, attachment means at spaced points at the link interlocks between the strip and the member whereby the bending of the strip is controlled by the reactive arc-forming member to fall within the locus of an arc, and means to apply pressure to the assembly at spaced points intermediate the ends thereof from a point source whereby the wiping element is conformed to the curved surface with substantially uniform pressure throughout its length.

7. In a device of the class described, a flexible wiping element, a resilient metal strip to support the wiping element through its entire length, said strip being bendable in one plane and adapted to conform the wiping element to contact a curved surface to be wiped, a multi-part bendable member including pivot points and mutual interlocks between the points extending the length of the strip adapted to automatically fall within the locus of an arc by mutual reaction of the parts, attachment means at the pivot points of the member between the strip and the member whereby the banding of the strip is controlled by the reactive member, and means to apply pressure to the assembly at spaced points intermediate the ends thereof whereby the wiping element is conformed to the curved surface.

8. In a device of the class described, a flexible wiping element, a resilient metal strip to support the wiping element, said strip being bendable in one plane and adapted to conform the wiping element to contact a curved surface to be wiped, a multi-part reactive member comprising interlocked overlapping links acting through pivot points at spaced points between the links extending the length of the strip, attachment means at the pivot points between the strip and the member whereby the bending of the strip is controlled by the reactive member to fall within the locus of an arc, and means to apply pressure to the assembly at spaced points intermediate the ends thereof whereby the wiping element is conformed to the curved surface.

9. In a device of the class described, a flexible rubber wiping element, a resilient metal strip movable only in the plane at right angles to a curved surface to be wiped, adapted to support the wiping element and to conform the wiping element to the curved surface, a multi-part reactive bendable member extending the length of the strip, comprising interlocked overlapped links mutually reactive about pivot points positioned between the overlapping link portions, attachment means at the pivot points between the strip and the member whereby the bending of the strip is controlled by the reactive member to remain within the locus of an arc, and means to apply pressure to the assembly from a point source to spaced points intermediate the ends thereof whereby the wiping element is conformed to the curved surface with substantially equal pressures per unit length.

10. In a device of the class described, a flexible wiping element, a resilient strip to support the wiping element, said strip being bendable in one plane and adapted to conform the wiping element to contact a curved surface to be wiped, a multi-part reactive member extending the length of the strip comprising a pair of mutually reactive parallel link chains active through pivot points positioned between adjacent links of the chains, attachment means at the pivot points between the strip and the member whereby the bending of the strip is controlled by the reactive member, and means to apply pressure to the assembly at spaced points intermediate the ends thereof whereby the wiping element is conformed to the curved surface.

11. In a device of the class described, a flexible wiping element, a resilient strip to support the wiping element, said strip being bendable in one plane and adapted to conform the wiping element to contact a curved surface to be wiped, a reactive member comprising at least six links extending in pairs the length of the strip, forming interlocking chains of links reacting through common pivot points between the chains, attachment means at the pivot points between the strip and the member whereby the bending of the strip is controlled by the reactive member to remain in the locus of an arc, and means to apply pressure to the assembly at spaced points intermediate the ends thereof whereby the wiping element is conformed to the curved surface.

12. In a device of the class described, a flexible rubber wiping element, a resilient metal strip bendable only in a plane at right angles to a curved surface to be wiped, and adapted to support the wiping element throughout its length to conform the wiping element to the curved surface, a reactive member consisting of at least six links interlocking in a pair of mutually reactive chains cooperating together through common pivot points and extending the length of the strip, attachment means at the pivot points between the strip and the member whereby the bending of the strip is controlled by the reactive member, and means to apply pressure to the assembly at spaced points intermediate the ends thereof whereby the wiping element is conformed to the curved surface.

References Cited in the file of this patent

UNITED STATES PATENTS

| 2,601,664 | Nesson | June 24, 1952 |
| 2,634,446 | Mackie | Apr. 14, 1953 |

FOREIGN PATENTS

| 427,383 | Great Britain | Apr. 23, 1935 |